(12) United States Patent
Aoki et al.

(10) Patent No.: US 6,401,012 B1
(45) Date of Patent: Jun. 4, 2002

(54) VEHICLE CONTROL APPARATUS

(75) Inventors: Takashi Aoki; Eijiro Shimabukuro, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/642,100

(22) Filed: Aug. 21, 2000

(30) Foreign Application Priority Data

Aug. 26, 1999 (JP) ............................................ 11-240585

(51) Int. Cl.$^7$ ............................................... F02D 29/02
(52) U.S. Cl. ............................ 701/1; 701/54; 123/179.4
(58) Field of Search ............................. 701/1, 22, 51, 701/53, 54, 65, 102, 112; 123/179.4, 198 D

(56) References Cited

U.S. PATENT DOCUMENTS

| | | | | |
|---|---|---|---|---|
| 5,390,116 A | * | 2/1995 | Hayafune | 701/65 |
| 5,428,531 A | * | 6/1995 | Hayafune | 701/65 |
| 6,199,001 B1 | * | 3/2001 | Ohta et al. | 701/51 |
| 6,275,759 B1 | * | 8/2001 | Nakajima et al. | 701/54 |
| 6,283,086 B1 | * | 9/2001 | Yamamoto et al. | 123/179.4 |

FOREIGN PATENT DOCUMENTS

| | | |
|---|---|---|
| JP | 8-61110 | 3/1996 |
| JP | 9-154205 | 6/1997 |
| JP | 9-209790 | 8/1997 |
| JP | 9-286245 | 11/1997 |

* cited by examiner

*Primary Examiner*—Gary Chin
(74) *Attorney, Agent, or Firm*—Armstrong, Westerman & Hattori, LLP

(57) ABSTRACT

A vehicle control apparatus which improves drivability by appropriately supplying oil pressure in accordance with road conditions to obtain sufficient drive force at an appropriate timing. Engine stop permission is determined, and when the engine stop permission has been given, the need for immediate start of the vehicle is determined in accordance with data related to the road, and when it has been determined that immediate start is required, the operation of the oil pressure generation apparatus is maintained.

8 Claims, 6 Drawing Sheets

VEHICLE CONTROL APPARATUS

BACKGROUND OF THE INVENTION

1. Field of the Invention

The present invention relates to a vehicle control apparatus applied to vehicles which are provided, in a power transmission path between the engine and the drive wheels, with an automatic transmission which is operated by oil pressure from an oil pressure generation apparatus.

This application is based on Japanese Patent Application No. Hei 11-240585, the contents of which are incorporated herein by reference.

2. Description of the Related Art

As is commonly known, engine temporary stop systems, which temporarily stop the engine in the state in which the vehicle is stopped at a signal or the like, or when accelerator OFF has been continued for a fixed period of time, have come into practical application. By means of these engine temporary stop systems, the engine is driven only when necessary for running, and is stopped at other times, and thereby, it is possible to improve fuel consumption, and to reduce the amount of exhaust gases by shortening the period of engine drive.

Hybrid vehicles, which are operated using a separate engine and electric motor in accordance with the running conditions, are known as examples of vehicles which employ such engine temporary stop systems. In such hybrid vehicles, when the vehicle is stopped, the internal combustion engine is automatically stopped by a directive from a control apparatus, and when the vehicle is started, running is initiated using the electric motor as the source of drive power, and it is possible to restart the internal combustion engine using the electric motor as a starter.

By means of this, it is possible to greatly improve fuel consumption in cases in which the period of stop is relatively long, such as running during traffic jams and like. Furthermore, in hybrid vehicles, the structure was fundamentally one in which an electric motor was simply inserted between the internal combustion engine and the gear box in conventional vehicles (vehicles which are not hybrid vehicles), so that it was possible to use the internal combustion engines and gear boxes which were employed in conventionally mass produced vehicles in an unchanged manner, and it was possible to carry out manufacturing without providing special manufacturing facilities, and thus it was possible to restrict the increase in costs.

In such a hybrid vehicle, when the vehicle is caused to restart after a temporary period of engine stop, when the power source for vehicle running and the oil pump which serves to supply oil for lubrication and cooling to the gear box are simultaneously started, as a result of a delay in oil supply, insufficient engaging force of the friction engaging apparatus and the like used for shifting gears may cause a slip, or sufficient lubrication may not be obtained. That is to say, until the oil pump reaches a predetermined oil pressure at which oil can be supplied, there is a slight time delay, whereas, for example, in the case in which the vehicle is caused to start by using the electric motor as the source of drive force, a superior response can be obtained in comparison with the engine, and it is likely that a delay in the supply of oil will occur.

In order to deal with this problem, a technology has been proposed in which, by means of electrifying the oil pump and stipulating the start timing there, the oil pressure is caused to rise prior to the transmission of power from the power source to the transmission (for example, in Japanese Patent Application, Unexamined, No Hei 9-286245). However, in this technology, the oil pressure rise timing may only be set by the conditions of the vehicle itself, such as the start switch operating key position, and thus it is impossible to conduct supply of oil pressure which is appropriate to the road conditions, and it is difficult to appropriately exhibit the drive force required by the road conditions.

SUMMARY OF THE INVENTION

In light of these conditions, in the present invention, the object is to obtain sufficient drive force at an appropriate timing by correctly supplying oil pressure in accordance with road conditions, and thereby, to improve the driving operability.

The following structures were adopted in the present invention in order to achieve the object described above.

In a first aspect of the present invention, a vehicle control apparatus (for example, control apparatus 2 in the embodiment) for application to vehicles (for example, hybrid vehicle 1 in the embodiment) which is provided with, in a power transmission path between an engine (for example, engine E in the embodiment) and drive wheels (for example, drive wheels W in the embodiment), an automatic transmission (for example, CVT 6 in the embodiment) which operates by oil pressure from an oil pressure generation apparatus (for example, oil pump 4 in the embodiment), comprising: an engine stop permission determining device (for example, the processing of step S3 in the embodiment) for determining permission to stop the engine; a start need determining device (for example, the processing of step S4 in the embodiment) for determining the need for the start of the vehicle in accordance with data related to the road, when stop permission of the engine is given by the engine stop permission determining device; and an oil pressure maintaining device (for example, the processing of steps S5 and S6 in the embodiment) for maintaining operation of the oil pressure generation apparatus when it has been determined by the start need determining device that the start is required.

According to this vehicle control apparatus, a determination as to the engine stop permission is conducted by an engine stop permission determining device and a determination as to the necessity of start is carried out in the start need determining device, and furthermore, the operation of the oil pressure generation apparatus is maintained in the oil pressure maintaining device based on the determination of the necessity of start.

In this way, even when engine stop has been permitted, it is possible to maintain a state in which oil pressure is supplied to the automatic transmission where necessary, and by means of this, it is possible to immediately transmit drive force to the drive wheels in response to a start request from the driver. For this reason, it is possible to improve the driving operability.

In a second aspect of the present invention, the start need determining device is provided with a right or left turning operation detecting device (for example, the processing of step S42 in the embodiment) for detecting whether the vehicle is in a right or left turning operation, and determines that the start is required when it is detected that the vehicle is in a right or left turning operation.

By providing such a structure, when it has been detected that the vehicle is in a right or left turn operation, since it is recognized that start is required, even when the vehicle is in a right or left turning operation in an intersection or the like, it is possible to maintain a state of oil pressure supplied to the automatic transmission, and it is possible to immediately transmit drive force from the engine to the drive wheels in response to a start request from the driver during right or left turn operations. By means of this, it is possible to improve the driving operability.

In a third aspect of the present invention, when the right or left turning operation detecting device detects that the vehicle is in the vicinity of a right or left turning point, during route guidance of a navigation apparatus (for example, navigation apparatus 27 in the embodiment) installed in the vehicle, it is determined that the vehicle is in a right or left turning operation.

By providing such a structure, it is recognized that the vehicle is in a right or left turn operation when the vehicle is in the vicinity of a right or left turning point during route guidance by the navigation apparatus, so that using data which have been previously widely employed by conventional navigation apparatuses, it is possible to easily and reliably ascertain whether the vehicle is in a right or left turn operation using a simple structure without providing special apparatus. Accordingly, this is capable of broad applicability, and may even be satisfactorily applied to mass produced vehicles of the conventional type, so that it is possible to avoid increases in vehicle cost accompanying the introduction of new parts.

Furthermore, in a fourth aspect of the present invention, the right or left turning operation detecting device determines that the vehicle is in a right or left turning operation when it is detected that the vehicle is in a dedicated right or left turning lane, based on data relating to the road obtained from a navigation apparatus (for example, navigation apparatus 27 in the embodiment) installed in the vehicle.

By providing such a structure, when it has been detected that the vehicle is in a right or left turn lane by the navigation apparatus, it is determined that the vehicle is in a right or left turn operation, so that it is possible to easily and reliably ascertain whether the vehicle is in a right or left turn operation using a simple structure without providing special apparatus.

In a fifth aspect of the present invention, the start need determining device is provided with an upward slope detecting device (for example, the processing of step S43 in the embodiment) for detecting that a road surface on which the vehicle is positioned slopes upwardly in the direction of progress, and when an upward slope is detected, it is determined that the starting is required.

By providing this structure, it is determined that start is required when the vehicle is on a road surface which slopes upwardly in direction of progress, so that when start is conducted on a sloping road, the state of oil pressure supplied to the automatic transmission is maintained. That is to say, it is possible to constantly supply oil pressure to the automatic transmission when the vehicle is positioned on a road having an upward slope. For this reason, when start is conducted on a sloping road, it is possible to cause the immediate transmission of drive force from the engine to the drive wheels in response to a start request from the driver. By means of this, it is possible to improve the driving operability.

In a sixth aspect of the present invention, the upward slope-detecting device determines whether the vehicle is positioned at a forward rise in the direction of progress based on the detection results of a vehicle forward and reverse acceleration sensor (for example, the G sensor 28 in the embodiment) positioned in the vehicle, and if a determination of forward rise is made, conducts detection of the upward slope.

By providing this structure, a determination is conducted as to whether the vehicle is on an upward sloping road surface based on the detection results of the vehicle forward and reverse direction acceleration sensor, so that it is possible to easily and reliably confirm whether the vehicle is on an upwardly sloping road surface using a simple structure without requiring special apparatus. Accordingly, this is capable of broad application, and it is possible to satisfactorily apply this to mass produced vehicles of the conventional type, so that it is possible to avoid increases in vehicle cost accompanying introduction of new parts.

Furthermore, in a seventh aspect of the present invention, the upward slope detecting device determines whether the height above sea level of the vehicle in the direction of progress is increasing based on data relating to the road obtained from a navigation apparatus (for example, navigation apparatus 27 in the embodiment) installed in the vehicle, and when it is determined that the height above sea level is increasing, conducts detection of the upward slope.

By providing this structure, it is recognized that the vehicle is on an upward slope when a determination is made that the height above sea level increases in the direction of progress of the vehicle, using data relating to the road obtained from the navigation apparatus, so that it is possible to easily and reliably ascertain whether the vehicle is on an upward sloping road surface using a simple structure without requiring special apparatus.

In a eighth aspect of the present invention, the oil pressure generation apparatus is comprised so as to be driven by the engine, and the oil pressure maintaining device is comprised so as to maintain operation of the oil pressure generation apparatus by canceling the stop permission of the engine.

Since this type of structure is provided, the operation of the engine is continued in order to maintain the supply of oil pressure, and in contrast to the conventional art, there is no need to control the startup timing of the oil pump using an electric motor or the like, so that it is not necessary to add additional parts, such as a motor-driven pump or the like, to maintain the oil pressure. By means of this, it is possible to avoid increased vehicle costs accompanying the introduction of new parts.

DETAILED DESCRIPTION OF THE PREFERRED EMBODIMENTS

Hereinbelow, an embodiment of the present invention will be explained based on the figures.

Figure 2:
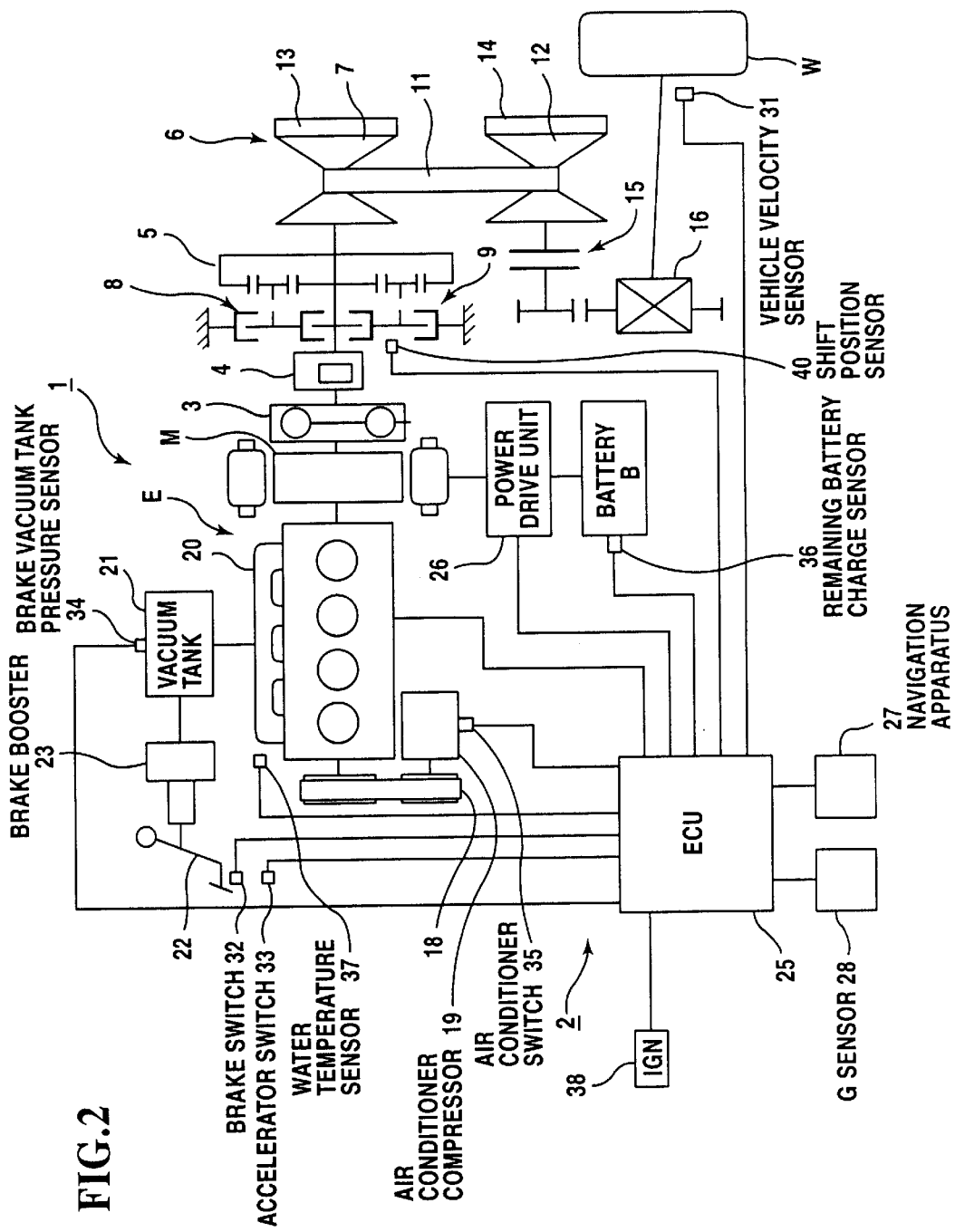
FIG. 2 is a schematic view of the power transmission system in a hybrid vehicle of the present invention and also shows a block diagram of the control apparatus.

FIG. 2 is a combination of a schematic diagram of a power transmission system of hybrid vehicle 1 and a block diagram of a control apparatus 2 which is applied to this hybrid vehicle 1.

Hybrid vehicle 1 has a structure in which the rotation of the drive shaft of engine E is assisted by a motor generator M which is coupled to engine E, and during deceleration, regenerative braking force is generated by motor generator M by the use of motor generator M as a generator, and the kinetic energy of the vehicle is recovered as electrical energy and power is supplied to battery B. Furthermore, in this hybrid vehicle 1, the output shaft of engine E is directly connected to the rotational shaft of motor generator M, so that when engine E is started, it is possible to employ motor generator M as a starter.

In the power transmission system shown in FIG. 2, the output shaft of engine E, and the rotational shaft of motor generator M which is coupled thereto, cause the rotation of dual mass fly wheel 3 and rotationally drive the oil pump 4. Furthermore, the output shaft of engine E and the rotational shaft of motor generator M are connected to the drive side pulley 7 of CVT (Continuously Variable Transmission) 6 via a forward and reverse progress switching planetary 5. By means of an oil pressure switching valve (not depicted in the figure) which is coupled to a select lever (not depicted in the figure), the forward and reverse progress switching planetary 5 is capable of being selectively engaged with hydraulically actuated friction elements 8 and 9 by manipulating the select lever, and by means of this, the direction of rotation of the power of the engine E or the motor generator M input into the drive side pulley 7 of CVT 6 is switched.

The rotation of drive side pulley 7 is transmitted to driven side pulley 12 via a metal belt 11. Here, the rotational ratio between the drive side pulley 7 and the driven side pulley 12 is determined by the winding diameter of the metal belt 11 with respect to each pulley, and this winding diameter is controlled by the pressed force generated by the oil pressure applied to the side chambers 13 and 14 of each pulley. This oil pressure is generated by oil pump 4 and is supplied to the side chambers 13 and 14. Furthermore, the rotation of the driven side pulley 12 is transmitted to the drive wheels W via a start clutch 15 and a differential 16.

Furthermore, the structure is such that the output shaft of engine E is connected to the air conditioner compressor 19 via a rotating belt 18, and furthermore, the air intake passage 20 of engine E is connected to the brake booster 23, which is coupled with the brake pedal 22, via a vacuum tank 21.

On the other hand, control apparatus 2 has a structure such that it is provided with an ECU 25 having a microcomputer comprising a CPU (Central Processing Unit), RAM (Random Access Memory), ROM (Read only Memory), and the like, which are not depicted in the figure. ECU 25 is connected to the fuel supply apparatus (not depicted in the figure) and the ignition apparatus (not depicted in the figure) of engine E, and controls the amount of fuel supplied to engine E and the ignition period and the like (that is to say, it controls engine E).

Furthermore, ECU 25 is connected to power drive unit 26. By means of this, power drive unit 26 receives directives from ECU 25, and is capable of controlling the drive and regenerative state of motor generator M.

Furthermore, ECU 25 is connected to a navigation apparatus 27, and by means of this, is capable of referring to data relating to the road obtained by the navigation apparatus 27 and thus controlling the engine E. Here, the data relating to the road include: (1) data relating to the height above sea level of the road on which the hybrid vehicle 1 is running, (2) data relating to whether the hybrid vehicle 1 is positioned in a right turn lane or a left turn lane on the road, and (3) data relating to whether the hybrid vehicle 1 is in the vicinity of right turn point or left turn point during guidance along a route.

Furthermore, ECU 25 is connected to G sensor 28 which is installed on hybrid vehicle 1, and the detection results of the G sensor 28 are input thereinto.

Furthermore, in order to conduct the control of engine E, the following signals are input into ECU 25.

(1) A signal from vehicle velocity sensor 31 which detects the velocity V of the vehicle based on the member of revolutions of the drive wheels W.

(2) A signal from the brake switch 32 which detects the operation of the brake pedal 22.

(3) A signal from the accelerator switch 33, which detects operation of the accelerator pedal (not depicted in the figure).

(4) A signal from a brake vacuum tank pressure sensor 34 which detects the internal pressure of the vacuum tank 21.

(5) A signal from the air conditioner switch 35 which turns the air conditioner compressor 19 ON and OFF.

(6) A signal from the remaining battery charge sensor 36, which detects the remaining charge (also referred to as the "state of charge" or SOC) of the battery B.

(7) A signal from the water temperature sensor 37, which detects the water temperature of the cooling water of the engine E.

(8) A signal from the ignition switch 38, which turns the ignition ON and OFF.

(9) A signal from the shift position sensor 40 which detects whether the forward and reverse progress switching planetary 5 is in the forward progress range or the reverse progress range.

Figure 1:
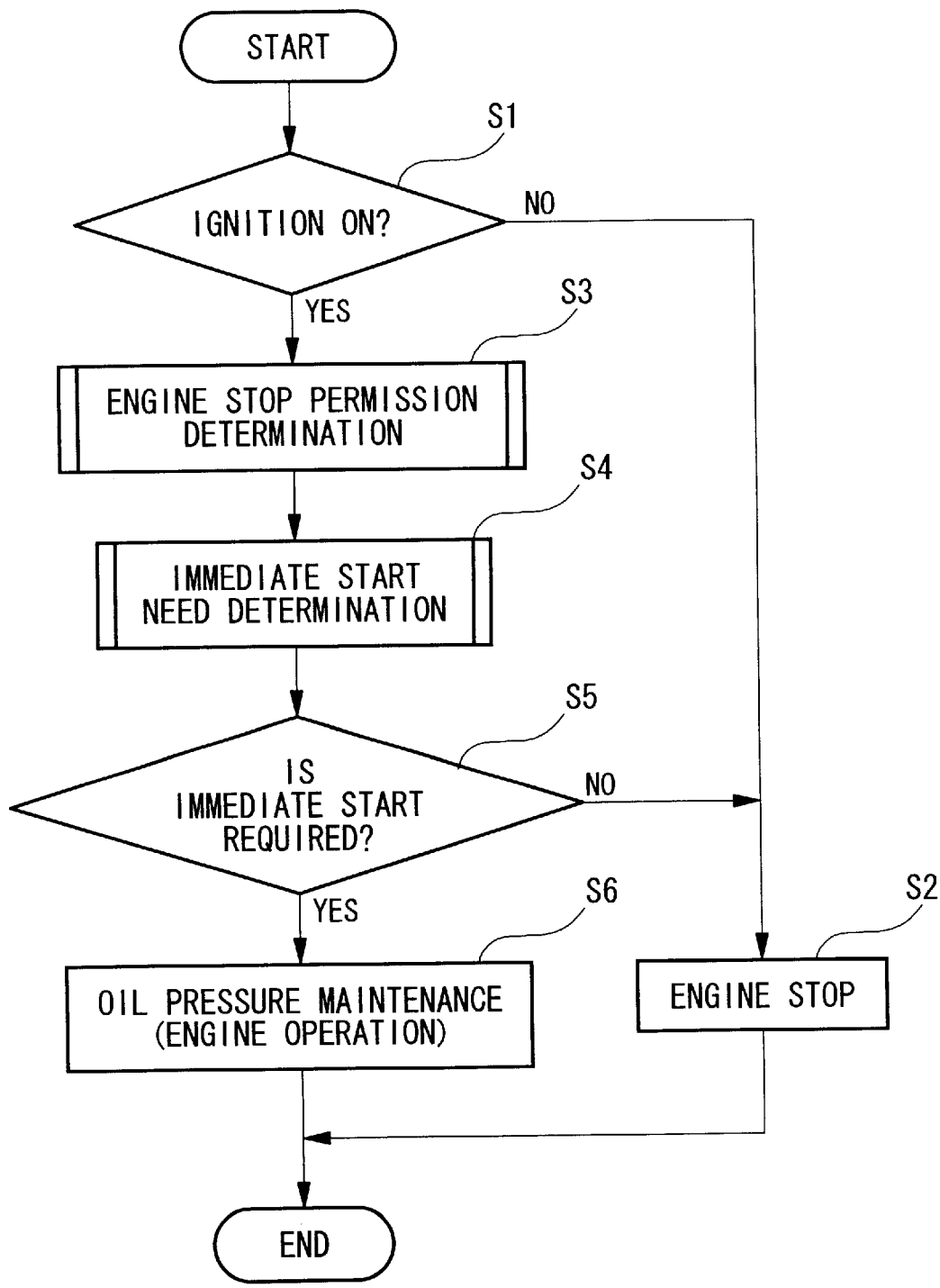
FIG. 1 is a diagram which depicts an embodiment of the present invention, and is a flowchart showing the order of engine control in the control apparatus.

In this control apparatus 2, ECU 25 controls the engine E based on a flowchart such as that shown in FIG. 1. First, in step S1, a determination is made as to whether the ignition switch 38 is in an ON state. In this case, when it is determined that ignition switch 38 is in an OFF state, then control proceeds to step S2, and engine E is stopped. Furthermore, when it is determined that the ignition switch 38 is in an ON state, then control proceeds to step S3.

Step S3 is a subroutine which conducts a determination of the stop permission of engine E, and after the processing of step S3, the processing of step S4 is conducted. Step S4 is a subroutine which determines whether the hybrid vehicle 1 requires immediate start when stop permission of engine E is given in step S3. After the processing of step S4, control proceeds to step S5, and it is confirmed whether a determination has been made as to the necessity of immediate start and when it has been determined in step S5 that immediate start is not required, then control proceeds to step S2, and engine E is stopped. Furthermore, when it has been determined in step S5 that immediate start is required, control proceeds to step S6, and the operation of oil pump 4 is continued, and oil pressure is maintained. Here, in order that oil pump 4 be rotationally driven by engine E, ECU 25 cancels the stop permission of engine E, and sends out a directive which continues the operation of engine E.

Next, the contents of the processing in the engine stop permission determination subroutine of step S3 will be explained with reference to FIG. 3.

Figure 3:
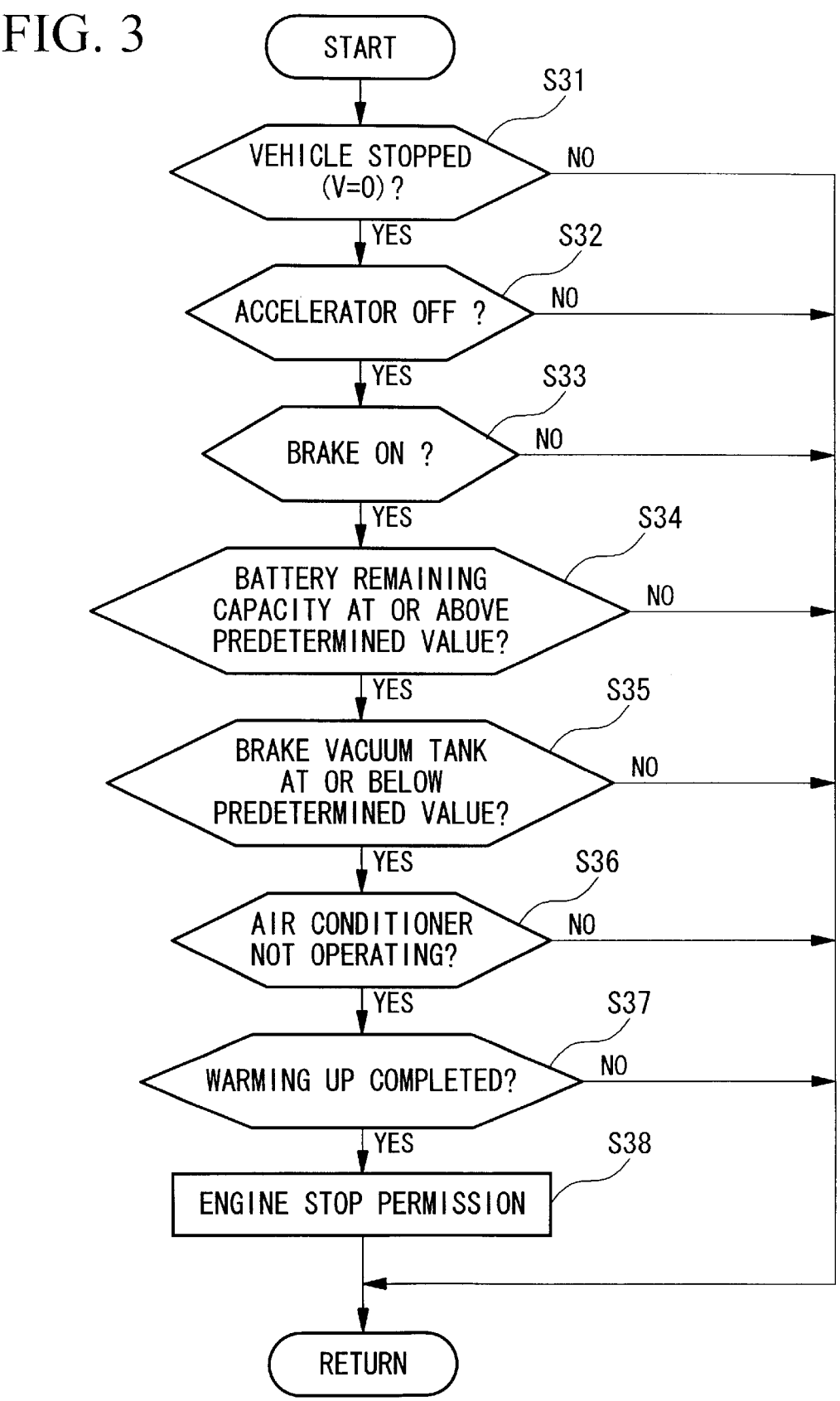
FIG. 3 is a flowchart showing the contents of the control of the engine stop permission determination in the flowchart shown in FIG. 1.

In the processing in FIG. 3, first, in step S31, it is determined whether the vehicle is stopped, that is to say, whether the vehicle velocity V=0, based on the detection results of vehicle velocity sensor 31. The permission to stop the engine E occurs in the case in which it is not necessary to operate the engine E, and fundamentally is during periods of vehicle stop. When the vehicle velocity V=0, control proceeds to step S32, and furthermore, when the vehicle velocity V does not equal 0, then control returns, bypassing the following processes.

In step S32, it is determined whether the accelerator is in an OFF state based on the results of the detection of accelerator switch 33. It is permissible to stop the engine E when the driver does not wish the vehicle to move, and here, this is determined by the OFF state of the accelerator. When the accelerator is in an OFF state, control proceeds to step S33, and furthermore, when the accelerator is not in an OFF state, then control returns, bypassing the following processes.

In step S33, a determination is made as to whether the brake is in an ON state based on the detection results of the brake switch 32. When the brake is in an ON state, as when the accelerator is an OFF state, this is thought to be because the driver does not want the vehicle to move. When the brake is in an ON state, control proceeds to step S34, and furthermore, when the brake is not in an ON state, then control returns, bypassing the following processes.

In step S34, a determination is made as to whether the remaining charge of the battery B is equal to or above a predetermined value based on the detection results of the remaining battery charge sensor 36. When the engine E is stopped, the engine E must be started again; however, the startup of the engine E is conducted using electrical power from battery B and by rotationally driving the motor generator M by means of the power drive unit 26, so that in order to permit the stop of engine E, the charge of battery B must be equal to or above the necessary electrical power for the startup of engine E. Accordingly, the predetermined value of the remaining battery charge must be set so as to exceed the sum of the power required for the startup of engine E and the power used to drive various accessories and the like which operate as an electrical load on battery B during engine stop; concretely, this is set to 100 Wh. When the remaining charge of the battery B is equal to or above the predetermined value, control proceeds to step S35, and when it is not equal to or above the predetermined value, control returns, bypassing the following processes.

In step S35, a determination is made as to whether the pressure of the vacuum tank 21 is equal to or below a predetermined value (for example, −250 mmHg), based on the detection results of the brake vacuum pressure sensor 34. The reason for this is that, in order to boost the brakes by means of the brake booster 23 using the air intake passage pressure during operation of the engine E, it is necessary to maintain the internal pressure of the vacuum tank 21 which stores the air intake passage pressure during brake operation equal to or below a pressure which guarantees brake operation, when engine E is stopped. Here, when the pressure of vacuum tank 21 is equal to or below the predetermined value, control proceeds to step S36, while when this pressure is not equal to or below the predetermined value, control returns, bypassing the following processes.

In step S36, a determination is made as to whether the air conditioner is operating or not, by means of the ON/OFF state of the air conditioner switch 35. The reason for this is that, since the air conditioner compressor 19 is rotationally driven by the output shaft of engine E via a rotating belt 18, when it is necessary to operate the air conditioner compressor 19 during operation of the air conditioner, the engine E should not be allowed to stop. When the air conditioner is not in operation, control proceeds to step S37, while when it is in operation, control returns, bypassing the following process.

In step S37, a determination is made as to whether the warming up of engine E has been completed, based on the detection results of water temperature sensor 37. The reason for this is that, when the warming up has not been completed immediately after the startup of engine E, the operation of engine E should be continued until warming up is completed. When the warming up of engine E has been completed, then engine stop permission is conducted in step S38, and control returns. Furthermore, when warming up has not been completed, control returns, bypassing step S38. In this way, in the engine stop permission determination subroutine shown in FIG. 3, the stop of engine E is permitted only when all of the conditions for the stop of engine E are fulfilled.

Next, the contents of the processing of the subroutine relating to the determination of need for immediate start of step S4 will be explained based on FIG. 4.

Figure 4:
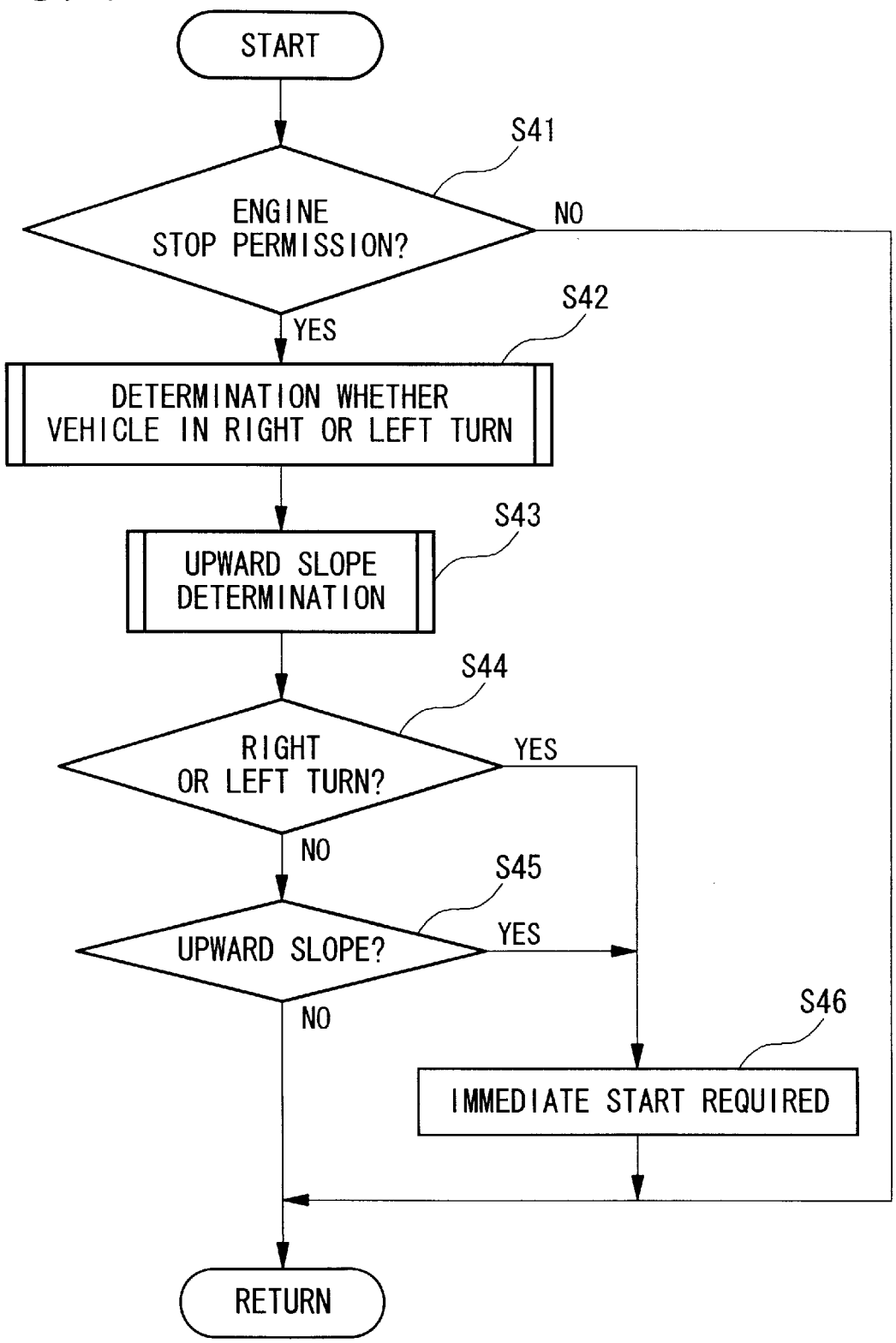
FIG. 4 is a flowchart showing the contents of the control of the immediate start need determination in the flowchart shown in FIG. 1.

In the processing shown in FIG. 4, first, a determination is made in step S41 as to whether the engine stop permission has been given. When the engine stop permission has not been given, then control returns, bypassing the following processes. When engine stop permission has been given, control proceeds to step S42.

Step S42 is a subroutine for determining whether the hybrid vehicle 1 is in a right or left turn operation, and after the processing of step S42, the processing of step S43 is conducted. Step S43 is a subroutine for determining whether the hybrid vehicle 1 is positioned on a road surface which has an upward slope in the direction of progress, and after conducting the processing of step S43, control proceeds to step S44.

In step S44, a determination is made as to whether the vehicle is in a right or left turn operation based on the results of the detection of step S42. When it has been determined that the vehicle is in a right or left turn operation, then in step S46, it is determined that immediate start is required, and control returns. Furthermore, when it has been determined that there is no right or left turn operation, control proceeds to step S45.

In step S45, a determination is made as to whether the vehicle is positioned on an upwardly sloping road surface based on the results of the detection of step S43. When it has been determined that the vehicle is positioned on a road surface which is upwardly sloping, then in step S46, it is determined that immediate start is required, and control returns. Furthermore, When it has been determined that the vehicle is not positioned on an upwardly sloping road surface, control returns without determining that immediate start is required.

Figure 5:
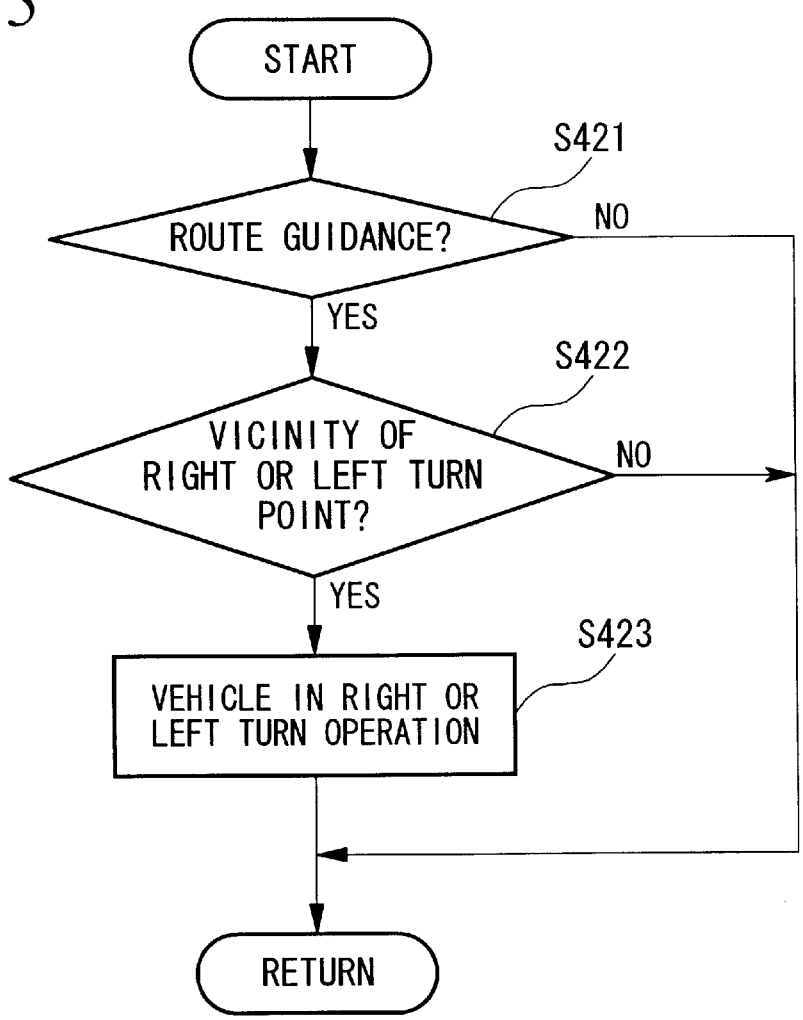
FIG. 5 is a flowchart showing the order when determining whether the vehicle is in a right or left turn operation in the flowchart shown in FIG. 4.

The contents of the processing of the subroutine of step S42 are shown in FIG. 5. In this processing, first, in step S421, a determination is made as to whether the hybrid vehicle 1 is in route guidance by navigation apparatus 27. Then, when a determination has been made that the vehicle is in route guidance, control proceeds to the following step S422. Furthermore, when it has been determined that the vehicle is not in route guidance, control returns, bypassing the following steps. In step S422, a determination is made as to whether the hybrid vehicle 1 is in the vicinity of a right or left turning point in the road, based on data related to the road obtained by the navigation apparatus 27. When it has been determined that the vehicle is in the vicinity of a right or left turning point, control proceeds to the following step S423, and furthermore, when it has been determined that the vehicle is not in the vicinity of a right or left turning point, control returns, bypassing the following processes. In step S423, a determination is made that the hybrid vehicle 1 is in a right or left turning operation.

Figure 7:
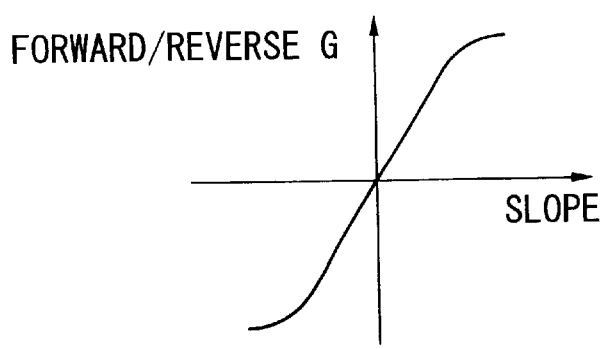
FIG. 7 is a graph showing the relationship between the gravitational acceleration operating in a forward or reverse direction on the vehicle and the gradient of the road surface on which the vehicle is positioned.
Figure 6:
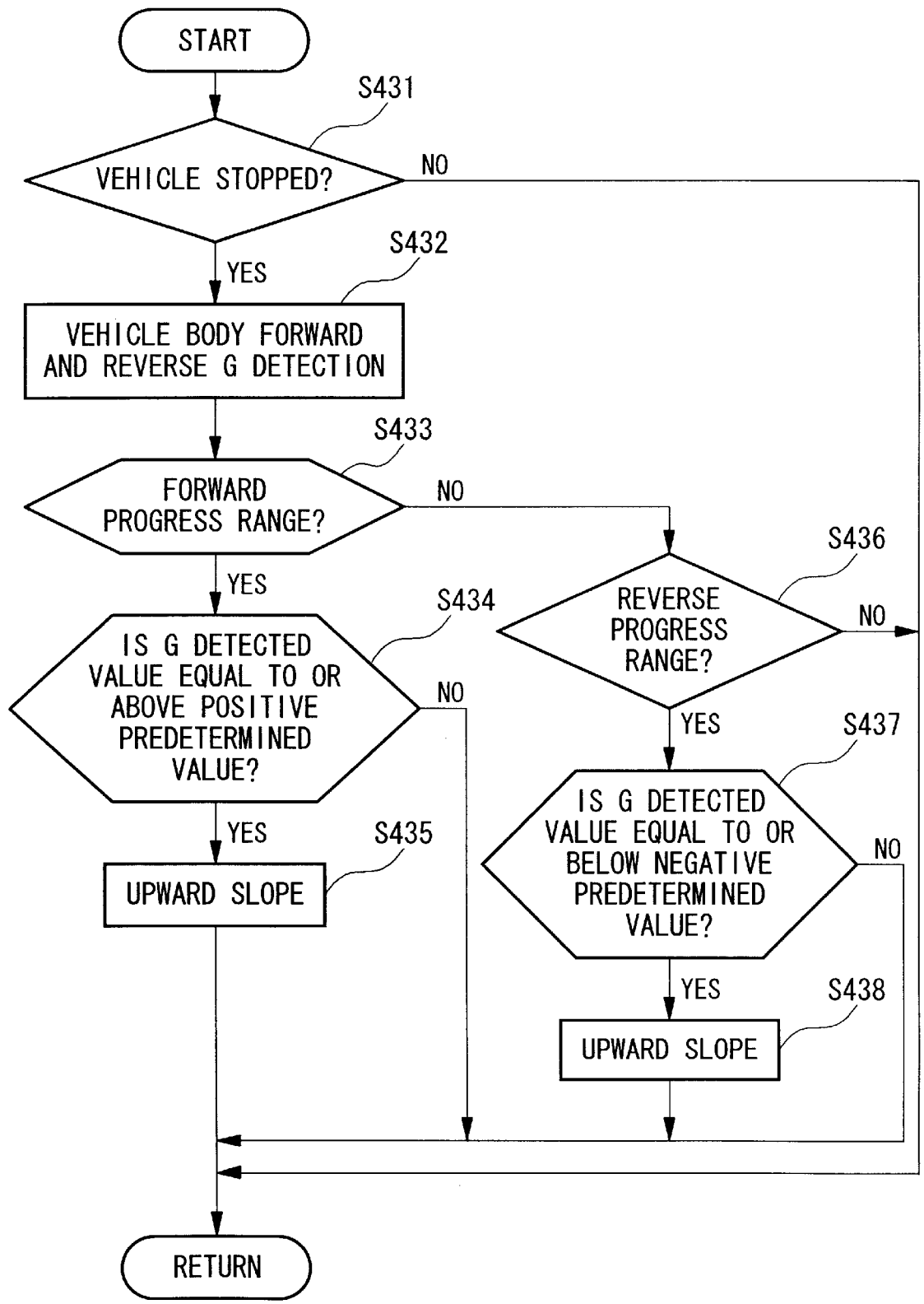
FIG. 6 is a flowchart showing the order of determination of whether the road surface on which the vehicle is positioned slopes upwardly in the direction of progress, in the flowchart shown in FIG. 4.

Furthermore, the contents of the processing of the subroutine in step S43 are shown in FIG. 6. In this processing, first, in step S431, a determination is made as to whether the vehicle is stopped. When the vehicle is stopped on a sloping road, the slope of the vehicle itself is essentially the same as the slope of the road. In the stopped state, the sine wave shaped relationship shown in FIG. 7 exists between the slope of the vehicle and the gravitational acceleration in the forward or reverse direction of the vehicle, so that it is possible to estimate the slope of the road from the slope of the vehicle, with some slight error. Furthermore, if the vehicle is not stopped, control returns, bypassing the following processes.

When it has been determined in step S431 that the vehicle is stopped, control proceeds to step S432, and the gravitational acceleration operating in the forward or reverse direction of the vehicle body is determined based on the results of the detection of the G sensor 28. Furthermore, in the following step S433, based on the results of the detection from the shift position sensor 40, a determination is made as to whether the shift position is in the forward progress range. If the position is in the forward progress range, then the forward rise state corresponds to the upward slope, and when it is determined in step S434 that the detected value of the gravitational acceleration is equal to or above a positive predetermined value (for example, 0.05 G, which corresponds to a slope of approximately 5%), then it is determined in step S435 that the vehicle is on a road surface which slopes upwardly in the direction of progress. Furthermore, when it has been determined in step S434 that the detected value of the gravitational acceleration is not equal to or above a positive predetermined value, then control returns, bypassing step S435.

Furthermore, when it has been determined that the shift position is not in the forward progress range in step S433, then a determination is made in step S436 as to whether the shift position is in the reverse progress range. When the position is in the reverse progress range, then the forward drop state corresponds to the upward slope, and when it is determined in step S437 that the detected value of the gravitational acceleration is equal to or below a predetermined negative value (for example, −0.05 G), then it is determined in step S438 that the vehicle is on a road surface which slopes upwardly in the direction of progress. Furthermore, when it has been determined in step S436 that the shift position is not in the reverse progress range, and it has been determined in step S437 that the gravitational acceleration is not equal to or below a predetermined negative value, then control returns, bypassing the following processes. In this way, it is possible to determine that the vehicle is on a road surface which slopes upwardly in the direction of progress.

In the control apparatus 2 for hybrid vehicles 1 described above, the stop permission of engine E is determined in step S3, while a determination is conducted in step S4 as to whether immediate start is necessary, and based on the determination that immediate start is required in steps S5 and S6, the operation of the oil pump 4 is maintained. By means of this, even when engine stop permission has been given, it is possible to maintain the supply state of oil pressure to CVT 6 where necessary, and it is possible to transmit drive force immediately to drive wheels W in accordance with the start request of the driver. For this reason, it is possible to improve the driving operability.

Furthermore, in accordance with this control apparatus 2, when it is detected in step S42 that hybrid vehicle 1 is in a right or left turn operation, then it is recognized that immediate start is required, so that even when the vehicle is in a right or left turn operation at an intersection or the like, it is possible to maintain the state of oil pressure supply to CVT 6, and it is possible to immediately transmit drive force from the engine E to drive wheels W in accordance with the start request of the driver during a right or left turn operation. By means of this, it is possible to improve the driving operability.

Furthermore, in this case, as shown in FIG. 5, when the hybrid vehicle 1 is in the vicinity of a right or left turning point during route guidance by navigation apparatus 27, the vehicle is recognized as being in a right or left turning operation; however, this is data which has previously been widely employed by conventional navigation apparatuses (in right and left turning guidance during route guidance), and it is possible to reliably recognize whether the vehicle is in a right or left turning operation by means of a simple structure. Accordingly, such a control apparatus 2 is widely applicable and is capable of satisfactory application even to mass produced vehicles of the conventional type, and it is thus possible to avoid the increase in vehicle costs which accompanies the introduction of new parts.

Furthermore, in this control apparatus 2, prior to conducting the processing of steps S5 and S6, when the vehicle is on a road surface which slopes upwardly in the direction of progress, a determination is made in step S4 as to whether immediate start is required, so that when start is conducted on a sloping road, the state of oil pressure supplied to CVT 6 can be maintained. For this reason, when start is conducted on a sloping street, it is possible to immediately transmit drive force from engine E to drive wheels W in accordance with the start request of the driver. By means of this, it is possible to improve the driving operability.

Furthermore, in this case, as shown in FIG. 6, based on the detection results of G sensor 28 which is installed in the vehicle, a determination is made as to whether the vehicle is on a upwardly sloping road surface, so that it is possible to reliably recognize whether the vehicle is on an upwardly sloping road surface using a simple structure. Accordingly, such a control apparatus 2 is capable of wide application and may easily be applied even to mass produced vehicles of the conventional type, so that it is possible to avoid the increase in vehicle costs accompanying the introduction of new parts.

Furthermore, in the control apparatus 2, the operation of the engine E is continued in order to maintain the operation of oil pump 4, so that, in contrast with the conventional art, it is not necessary to control the startup timing of the oil pump using an electric motor or the like, and it is thus possible to avoid the increase in vehicle costs associated with the introduction of new parts.

An embodiment of the present invention was described above; however, this invention is not necessarily limited to the embodiment described above, and other structures may be adopted so long as they are such as to not depart from the essence of the present invention.

For example, in the embodiment described above, the determination of whether the vehicle was in a right or left turn operation was conducted by reference to right or left turning points in the route guidance of the navigation apparatus 27, and furthermore, the determination as to whether the vehicle was positioned on an upwardly sloping road was conducted using the detection results of G sensor 28; however, in place of these, these determinations may be conducted by other data relating to the road obtained from the navigation apparatus 27.

In this case, instead of conducting the determination of whether the vehicle is in a right or left turn operation by means of the processing of steps S421 and S422 in the embodiment described above, when reference is made to the data relating to the road described above, a determination may be conducted as to whether the position of the vehicle obtained from the navigation apparatus 27 is in a right turn lane or a left turn lane in the road, and a determination as to whether the vehicle is in a right or left turn operation may be conducted based on the results of this determination.

Furthermore, instead of conducting the determination as to whether the vehicle is positioned on an upwardly sloping road surface by means of the processing of steps S434 and S437 in the embodiment described above, based on the data relating to the height above sea level of the road obtained from the navigation apparatus 27, the road surface gradient of the road on which the vehicle is positioned may be calculated, and a determination may be conducted as to whether this road surface gradient is equal to or above a positive predetermined value (for example, 5%) or equal to or below a negative predetermined value (for example, −5%).

By conducting processing using the navigation apparatus 27 in this manner, it is possible to instantly ascertain whether the vehicle is in a right or left turn operation on the road, or whether the road is upward sloping in the direction of progress of the vehicle, and this facilitates the control processing.

Furthermore, the control apparatus 2 of the embodiment described above is not limited to hybrid vehicles; it may be employed in other vehicles in which an automatic transmission is disposed between the engine and the drive wheels.

What is claimed is:

1. A vehicle control apparatus for application to a vehicle which is provided with, in a power transmission path between an engine and drive wheels, an automatic transmission which operates by oil pressure from an oil pressure generation apparatus, comprising:

an engine stop permission determining device for determining permission to stop said engine;

a start need determining device for determining the need for the start of said engine in accordance with data related to the road, when stop permission of said engine is provided by said engine stop permission determining device; and an oil pressure maintaining device for maintaining operation of said oil pressure generation apparatus when it has been determined by said start need determining device that the start is required.

2. A vehicle control apparatus in accordance with claim 1, wherein:

said start need determining device is provided with a right or left turning operation detecting device for detecting whether said vehicles in a right or left turning operation, and determines that said start is required when it is detected that said vehicle is in a right or left turning operation.

3. A vehicle control apparatus in accordance with claim 2, wherein:

when said right or left turning operation detecting device detects that said vehicle is in the vicinity of a right or left turning point, during route guidance of a navigation apparatus installed in said vehicle, it is determined that said vehicle is in a right or left turning operation.

4. A vehicle control apparatus in accordance with claim 2, wherein:

said right or left turning operation detecting device determines that said vehicle is in a right or left turning operation when it is detected that said vehicle is in a dedicated right or left turning lane, based on data relating to the road obtained from a navigation apparatus installed in said vehicle.

5. A vehicle control apparatus in accordance with claim 1, wherein:

said start need determining device is provided with an upward slope detecting device for detecting that a road surface on which said vehicle is positioned slopes upwardly in the direction of progress, and when an upward slope is detected, it is determined that said start is required.

6. A vehicle control apparatus in accordance with claim 5, wherein:

said upward slope detecting device determines whether said vehicle is positioned at a forward rise in the direction of progress based on the detection results of a vehicle forward and reverse acceleration sensor positioned in said vehicle, and if a determination of forward rise is made, conducts detection of said upward slope.

7. A vehicle control apparatus in accordance with claim 5, wherein:

said upward slope detecting device determines whether the height above sea level of said vehicle in the direction of progress is increasing based on data relating to the road obtained from a navigation apparatus installed in said vehicle, and when it is determined that the height above sea level is increasing, conducts detection of said upward slope.

8. A vehicle control apparatus in accordance with one of claims 1 through 7, wherein said oil pressure generation apparatus is driven by said engine, and wherein said oil pressure maintaining device maintains the operation of said oil pressure generation apparatus so as to maintain the oil pressure supplied to said automatic transmission by canceling the stop permission of said engine to continue the operation of said engine.

* * * * *